US006540439B2

(12) United States Patent
De Bruijn et al.

(10) Patent No.: US 6,540,439 B2
(45) Date of Patent: Apr. 1, 2003

(54) JUNCTION SEAL BETWEEN A LINER OF AN UNDERGROUND STRUCTURE AND A PENETRATING PIPE

(75) Inventors: Hans De Bruijn, Lancaster, PA (US); Michael D. Zeiber, Reading, PA (US)

(73) Assignee: Terre Hill Silo Company, Terre Hill, PA (US)

( * ) Notice: Subject to any disclaimer, the term of this patent is extended or adjusted under 35 U.S.C. 154(b) by 0 days.

(21) Appl. No.: 10/071,530

(22) Filed: Feb. 8, 2002

(65) Prior Publication Data

US 2002/0071723 A1 Jun. 13, 2002

Related U.S. Application Data

(62) Division of application No. 09/604,839, filed on Jun. 27, 2000, now abandoned.

(51) Int. Cl.[7] .................................................. F16L 55/16

(52) U.S. Cl. ................................ 405/150.1; 405/184.2; 138/98

(58) Field of Search ........................... 405/184.2, 150.1, 405/150.2, 151, 152, 153, 268, 303, 146; 138/97, 98, 125; 156/287, 294, 93, 94; 264/269, 36.17, 516

(56) References Cited

U.S. PATENT DOCUMENTS 5,971,031 A * 10/1999 Kamiyama et al. ........... 138/98
6,056,017 A * 5/2000 Kamiyama et al. ........... 138/98

* cited by examiner

*Primary Examiner*—David Bagnell
*Assistant Examiner*—Sunil Singh
(74) *Attorney, Agent, or Firm*—Martin Fruitman

(57) ABSTRACT

The apparatus is an underground structure liner based upon an inflatable liner structure. An acid resistant layer is the innermost layer of an inflatable liner, and the liner is coated with epoxy resin on its outermost surface, the surface which contacts the existing walls of the underground structure. The outermost coated surface of the liner is constructed with a fibrous fleece layer for retention of the epoxy and adhesion of the epoxy to the walls of the underground structure. An added feature of the liner is a structure which also seals the liner to pipes entering the underground structure.

1 Claim, 4 Drawing Sheets

JUNCTION SEAL BETWEEN A LINER OF AN UNDERGROUND STRUCTURE AND A PENETRATING PIPE

This is a division of application Ser. No. 09/604,839 filed Jun. 27, 2000, and now abandoned.

BACKGROUND OF THE INVENTION

The invention deals generally with underground structures such as manholes, utility vaults, and pump stations, and more specifically with a method and apparatus to attach an impermeable continuous liner to prevent corrosion by the effects of sewer gas and to prevent fluid leaking into the underground structure.

Underground structures such as manholes serve to connect pipes, transfer sewage, and provide maintenance access. When they permit ground water to leak in, they contribute to unnecessary sewage treatment costs or damage the sewer lines or other utility services which pass through the underground structures. Furthermore, microorganisms that consume sewer gas form sulfuric acid, and this acid dissolves the underground structure walls which may lead to deterioration, collapse, service interruption, or accidents.

This deterioration is caused mainly because of the nature of the original structure. Underground structures such as manholes are essentially chambers in the ground, sometimes large vertical shafts, which extend to the depth at which sewer pipes or utility services are located. The older chambers are usually built of bricks or cement blocks, with the bricks or blocks assembled with mortar joints. These materials, and particularly the joints, deteriorate with time because of such factors as traffic loads, ground water, soil pressure, and septic gases. Even cast concrete underground structures can be damaged by such causes, particularly from the acids septic gases create and which attack most materials.

Once an underground structure is damaged and leaking, it is very difficult to repair it so that it is watertight and gas tight, and completely rebuilding it is costly and time consuming because it requires excavating all around the underground structure.

Several patents have been issued on a newer approach to repairing underground structure chambers. The technique involves attaching a liner to the inside wall surface of the underground structure chamber. As described in U.S. Pat. Nos. 5,490,744 and 5,265,981 by McNeil, the liner is typically a long fiberglass bag covered with an epoxy resin. This bag is lowered into the underground chamber, inflated by the use of a removable interior inflatable bladder until it presses against the inside walls of the underground chamber, and the resin is cured in place. The result is the formation of a new chamber which conforms to the original underground structure regardless of whether the chamber is a straight cylinder or it has an irregular shape. However, this type of additional internal chamber still has problems.

The structure of the McNeil liners, which have fiberglass and resins on the exposed surfaces, are themselves attacked by septic gases. This causes erosion of the exposed fiberglass layers which deteriorate over time and ultimately weaken the rehabilitation structure. Furthermore, at liner termination points such as junctions where the liner is joined to pipes and flow channels, gas infiltration leads to corrosion of the underground structure walls and destruction of the liner bond.

It would be very beneficial to have a underground structure liner which was chemically stable, allows gas-tight joints with pipe lining, and prevents fluid leakage into the underground chamber.

SUMMARY OF THE INVENTION

The present invention solves the problems with crumbling of fiberglass epoxy layers that are exposed to sewer gas and of joint adhesion with pipe linings by constructing the liner in a different fashion. The liner of the present invention includes two essential layers. The first layer is an acid resistant layer which is the innermost layer, the layer exposed to the environment of the underground structure. The second layer is located on the outside and is the layer in contact with the wall of the underground structure. This layer is a fleece layer, a continuous layer of fibers protruding from the acid resistant layer. The fleece layer is integrated into the acid resistant material and serves to capture and retain the epoxy resin applied to the liner. Furthermore, the fibers of the fleece layer function as multiple anchors as they contact the wall of the underground structure and form a continuous layer which conforms to irregularities and crevices in the underground structure wall surface. Reinforcing material can also be added to the fleece layer. Typically this reinforcing material is a cloth layer which is also saturated with resin, and it can be added to the outside of the fleece layer. However, the reinforcing material can also be integrated into the epoxy resin by applying a mixture of epoxy resin and fibers directly onto the fleece layer.

In the preferred embodiment the material of the acid resistant layer is polyvinyl chloride (PVC), the fleece layer is polyester, and the cloth layer is fiberglass. The thicknesses of the layers can be adjusted for the specific application to yield, for instance, greater strength or acid resistance.

Several methods of applying the epoxy resin are available. A two part resin can be applied to the fleece layer or to the fiberglass layer at the installation site just before insertion into the underground structure. A delayed reaction epoxy can also be applied to the liner before it arrives at the installation site, in which case the epoxy is cured by subjecting the assembly to elevated temperature or to some other activating agent such as light or other radiation.

The present invention also affords a means to create a superior seal between the liner installed within the underground structure and the pipes entering into the underground structure. To accomplish this, a PVC cap is formed which is inserted into the end of the pipe at the underground structure. This cap is held in the pipe with an expansion ring, and the cap extends out of the pipe end and is bonded to the liner and to a fiberglass disc which is attached to the bottom of the underground structure.

The liner of the present invention and the pipe seal together completely protect the original underground structure walls from any further contact with acid products from within the underground structure while also strengthening the walls and preventing ground water from leaking into the underground structure.

DETAILED DESCRIPTION OF THE INVENTION

Figure 1:
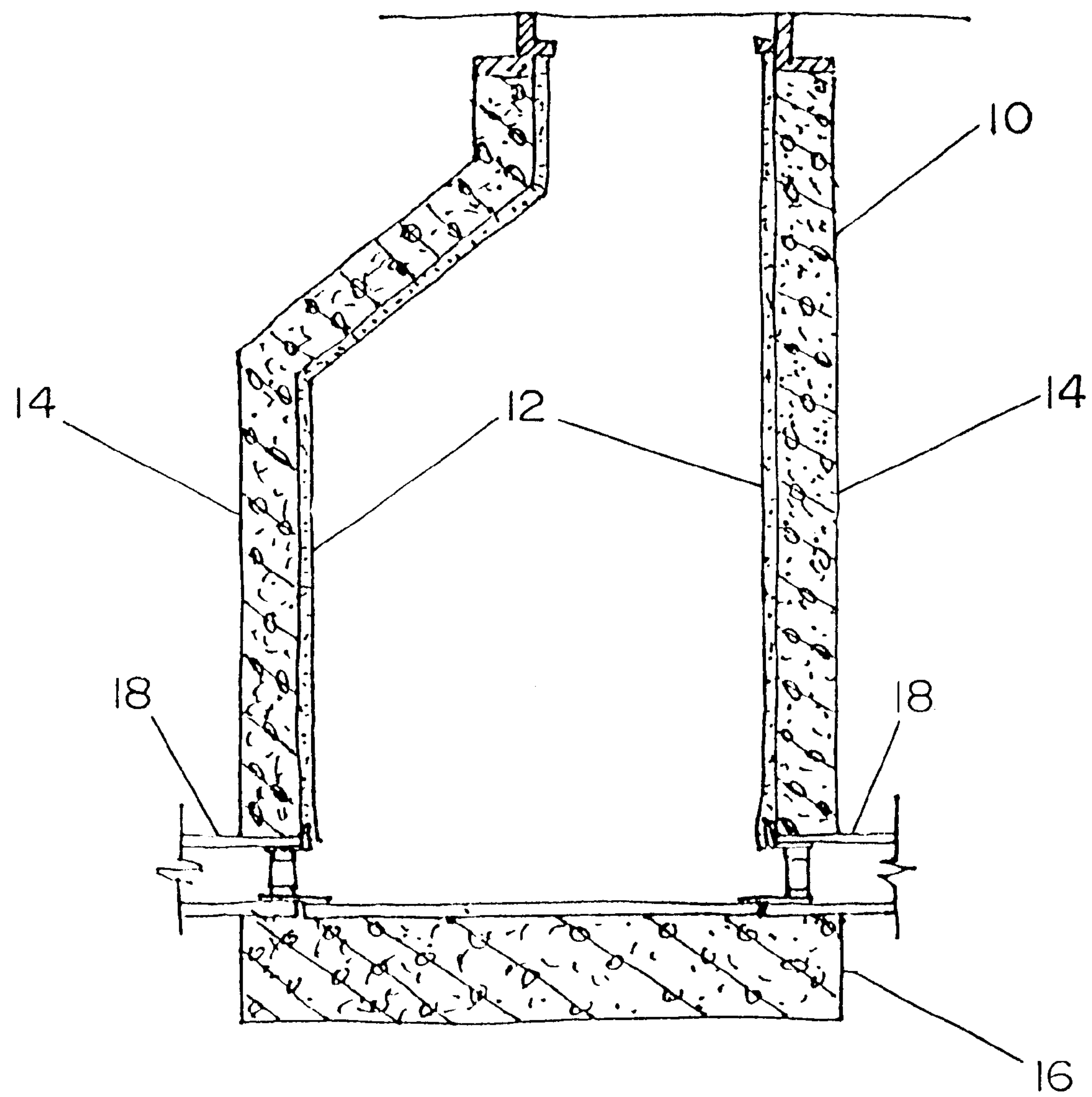
FIG. 1 is a simplified cross section view of an underground structure with the liner of the preferred embodiment installed in the interior of the underground structure.

FIG. 1 is a simplified cross section view of underground structure 10 with liner 12 of the preferred embodiment installed in the interior of underground structure 10. Underground structure 10 has vertical walls 14 and bottom slab 16, and although underground structure 10 is shown in FIG. 1 as constructed of concrete, older underground structures are sometimes constructed of bricks or concrete blocks. Liner 12 is installed to seal cracks within underground structure walls 14 and to reinforce walls 14 to prevent continuing damage.

Pipes 18 penetrate walls 14 as they do in most underground structures to move sewage or to give access to other utilities, and pipes 18 must also be sealed to liner 12. The description of this seal follows with the discussion of FIG. 4.

Figure 2:
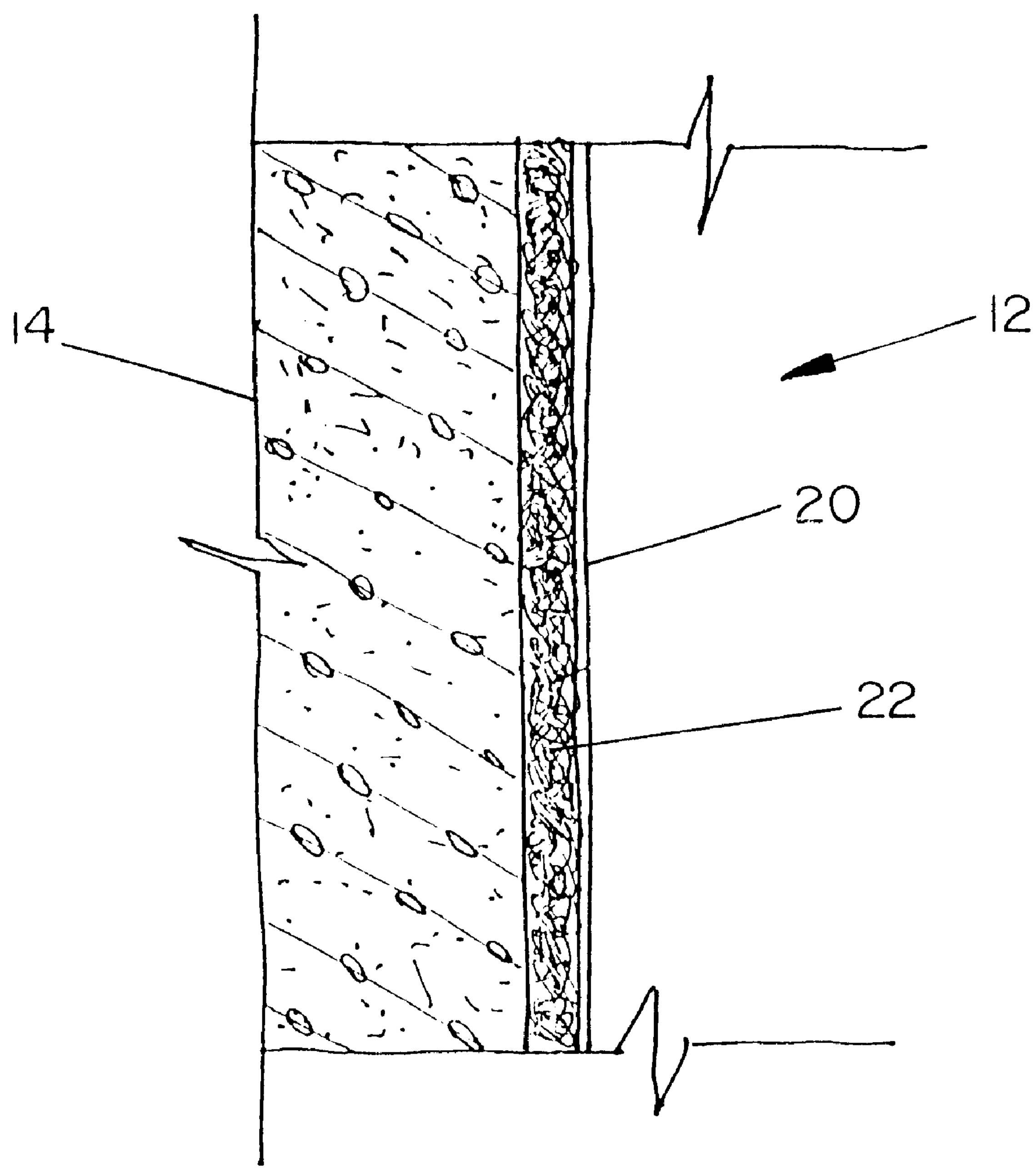
FIG. 2 is an enlarged cross section view of a portion of the liner of the preferred embodiment of the invention.

FIG. 2 is an enlarged cross section view of a portion of liner 12 of the preferred embodiment of the invention when it is attached to underground structure wall 14.

Liner 12 of the present invention includes two essential layers. Interior layer 20, which is exposed to the interior environment of underground structure 10, is an acid resistant layer. The second layer is fleece layer 22, a continuous layer of fibers protruding from acid resistant interior layer 20. Fleece layer 22 is integrated into acid resistant interior layer 20 and is impregnated with an epoxy resin which it captures and retains. When fleece layer 22 is in contact with underground structure wall 14, the fibers of fleece layer 22 function as multiple anchors as they contact underground structure wall 14 and form a continuous layer which conforms to irregularities and crevices in the underground structure wall surface.

In the preferred embodiment the material of the acid resistant layer is 0.018 inch thick polyvinyl chloride (PVC), thermally bonded to a 10 oz. polyester fleece layer. The product is manufactured by Ferland Industries. A liner made to this specification will resist acids such as sulfuric acid. The thicknesses of all of these layers can be adjusted for the specific application to yield, for instance, greater strength and superior acid resistance.

Several methods of applying the epoxy resin are available. A two part resin can be applied to fleece layer 22 or to the fiberglass layer 24 (FIG. 3) at the installation site just before insertion into underground structure 10. The resin used for the preferred embodiment is a mixture of 60% part A and 40% part B, with part A being 90% PEP 6128 and 10% PEP 6748 and part B being 30% PEP 9140 and 70% PEP 9254. All the PEP products are sold by Pacific Epoxy Polymers, Inc. of Richmond, Mo.

A delayed reaction epoxy can also be applied to liner 12 before it arrives at the installation site, in which case the epoxy is cured by subjecting the assembly to elevated temperature or to some other activating agent such as light or other radiation.

Figure 3:
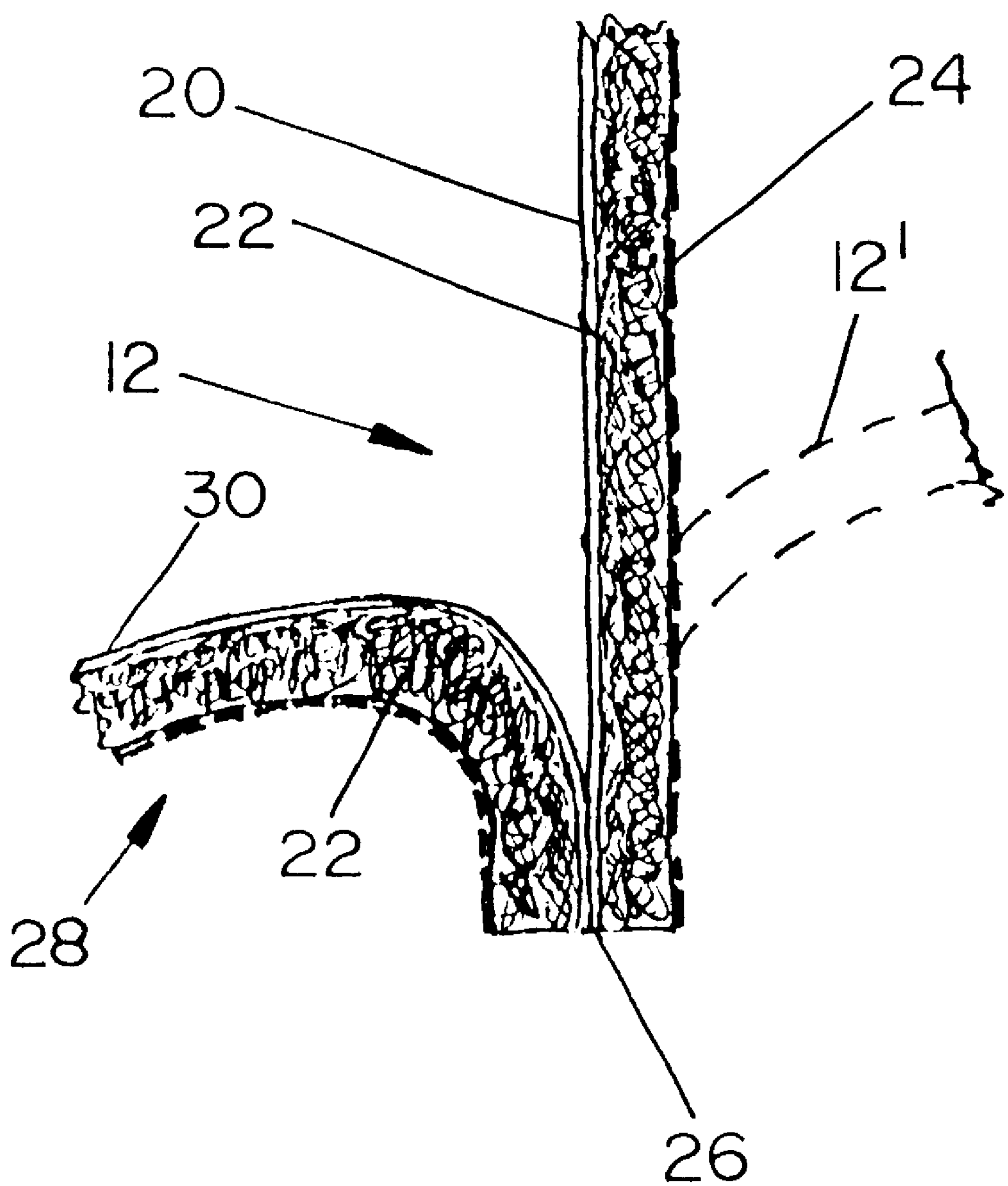
FIG. 3 is a simplified cross section of a seam used to attach the bottom of the liner to the wall and to attach flat side panels to each other to form the wall and the bottom of the liner.

FIG. 3 is a simplified cross section of seam 26 which is used to attach bottom panel 28 of liner 12. The same seam 26 is used to attach individual flat side panels to each other to form walls 14 or bottom panel 28 of liner 12. The seam between flat side panels can be better understood if bottom panel 28 of FIG. 3 and panel 12', shown in phantom lines, are visualized as adjacent side panels viewed from the top. All of seams 26 are formed by bonding together impervious layers 20 and 30 of adjacent panels. Such bonds are made by conventional methods such as by the use of fusion welding of the materials, by sewing, or by the use of an intermediate bonding material such as epoxy or glue. Such materials are available on the market as HH-66 PVC glue sold by R-H Products Co. Inc. of Acton, Mass.

It is important that seam 26 be formed by joining together impervious interior layers 20 and 30 as opposed to the more traditional technique of simply overlaying adjacent panels. Overlaying the adjacent panels attaches an impervious layer to a fleece layer 22, and although the joint would probably be structurally sound, there is little assurance that it would be leak tight.

The use of seams 26 to form an entirely enclosed liner 12 provides an added benefit over the prior art. Existing underground structure liners have all been installed by the use of a separate removable air tight bladder which is placed within the liner when the liner is inserted into the underground structure. The separate bladder is then inflated to hold the liner against the underground structure wall as the epoxy resin cures and the bladder is removed after curing.

Seams 26 and bottom 28 produce a liner which is itself completely leak tight, and it therefore does not require the use of an inflation bladder. A liner such as liner 12 is directly inflated in the same manner as previous bladders, with hot air or a mixture of air and steam, but does not require the cost, time, and extra labor of installing the additional inflatable bladder.

As also shown in FIG. 3, reinforcing material can also be added on top of or within fleece layer 22. Typically this reinforcing material is cloth layer 24 which is also saturated with resin, and it can be added to the outside of fleece layer 22. However, the reinforcing material can also be integrated into the epoxy resin by spraying a mixture of epoxy resin and fibers directly onto the fleece layer. The cloth layer of the preferred embodiment is 18 or 24 oz. fiberglass cloth sold by Vetrotex America of Wichita Falls, Tex.

Figure 4:
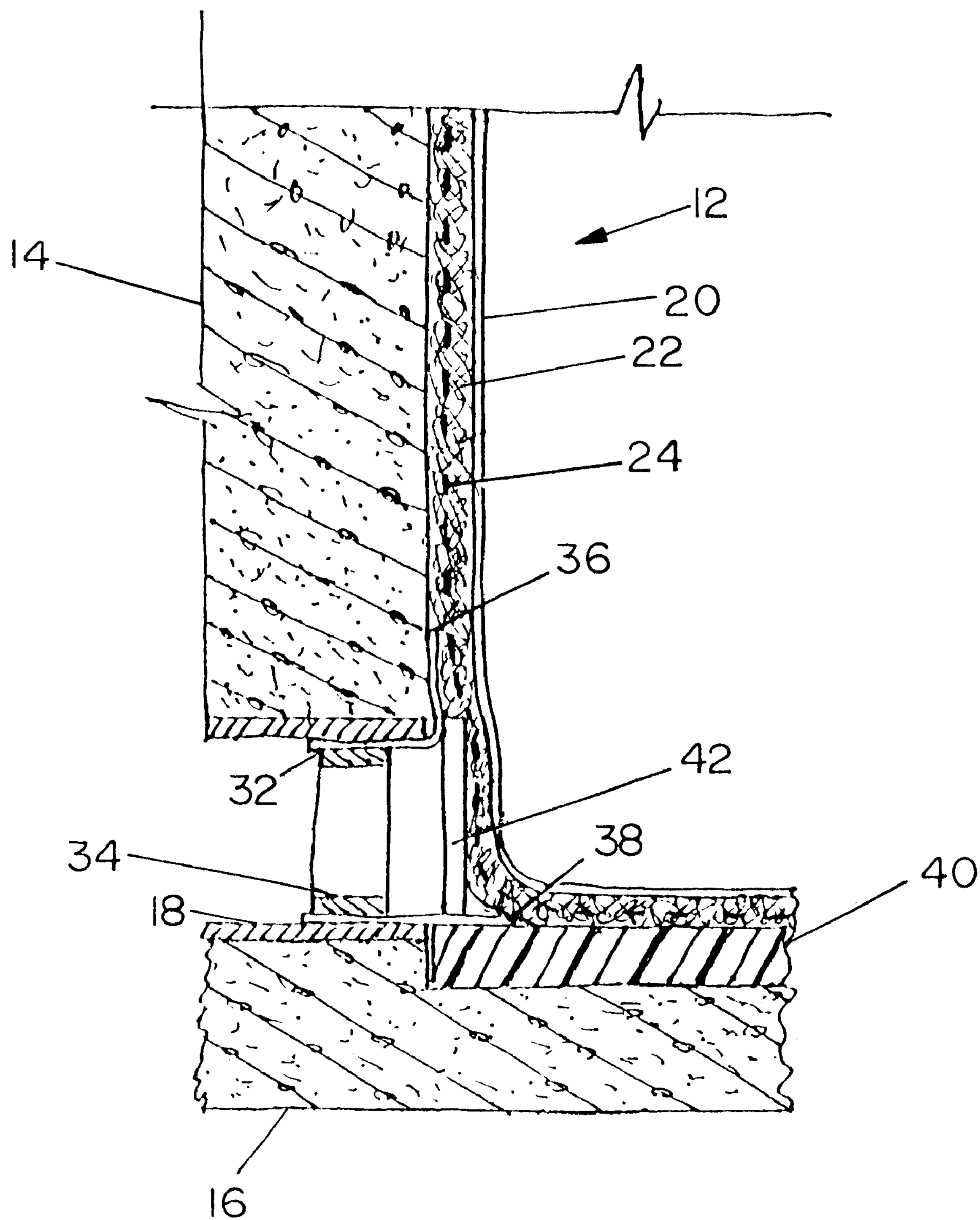
FIG. 4 is a simplified cross section view of the preferred embodiment of a seal between the liner of the invention and a pipe entering the underground structure.

FIG. 4 is a simplified cross section view of the preferred embodiment of a seal between underground structure liner 12 and pipe 18 entering underground structure 10. When properly prepared, such a seal can be made after liner 12 has been inflated and attached to underground structure wall 14. In preparation for the seal, capping strip 32 is placed into pipe 18 and held tightly in place with conventional expansion ring 34. Capping strip 32 is then expanded and bonded to underground structure wall 14 at end 36, and also bonded at edge 38 to fiberglass leveling disc 40. Temporary plywood disc 42 is then set against the end of pipe 18 to prevent liner 12 from expanding into pipe 18. Later, after liner 12 is bonded to underground structure wall 14 and to fiberglass disc 40, temporary plywood disk 42 and the portion of liner 12 bonded to it are removed to open up pipe 18 again.

The present invention thereby furnishes a underground structure liner with improved bonding to the underground structure wall and also eliminates the need for an additional inflation bladder.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters patent of the United States are desired to be secured is:

1. A method of constructing a junction between an underground structure liner and a pipe penetrating a wall of an underground structure comprising:

installing a cap strip of impermeable material tightly against and covering the interior surface of the pipe penetrating the wall of the underground structure, with a portion of the cap strip extending out of an end of the pipe into the underground structure and bonded to the wall of the underground structure;

covering the end of the pipe and the cap strip at the end of the pipe with a temporary barrier;

installing the underground structure liner within the underground structure and covering over the temporary barrier at the end of the pipe within the underground structure, with the liner bonded to the wall of the underground structure and to the portion of the cap strip bonded to the wall of the underground structure; and removing the temporary barrier and the portion of the liner in contact with the temporary barrier from the end of the pipe.

* * * * *